US012639826B2

(12) United States Patent
Zhao et al.

(10) Patent No.: US 12,639,826 B2
(45) Date of Patent: May 26, 2026

(54) METHOD AND DEVICE OF BINDING SECURITY INSPECTION INFORMATION, ELECTRONIC APPARATUS, AND READABLE STORAGE MEDIUM

(71) Applicants: NUCTECH COMPANY LIMITED, Beijing (CN); Tsinghua University, Beijing (CN); Beijing Shenmutek Company Limited, Beijing (CN)

(72) Inventors: Ziran Zhao, Beijing (CN); Jianping Gu, Beijing (CN); Yingxin Wang, Beijing (CN); Shaoming Yuan, Beijing (CN); Li Gu, Beijing (CN); Yitao Jiao, Beijing (CN)

(73) Assignees: NUCTECH COMPANY LIMITED, Beijing (CN); Tsinghua University, Beijing (CN); Beijing Shenmutek Company Limited, Beijing (CN)

( * ) Notice: Subject to any disclaimer, the term of this patent is extended or adjusted under 35 U.S.C. 154(b) by 514 days.

(21) Appl. No.: 18/088,433

(22) Filed: Dec. 23, 2022

(65) Prior Publication Data

US 2023/0206463 A1     Jun. 29, 2023

(30) Foreign Application Priority Data

Dec. 27, 2021     (CN) .......................... 202111617954.3

(51) Int. Cl.
*G06T 7/20* (2017.01)
*G01N 23/04* (2018.01)
(Continued)

(52) U.S. Cl.
CPC .............. *G06T 7/20* (2013.01); *G01N 23/04* (2013.01); *G06V 10/44* (2022.01); *G06V 10/761* (2022.01);
(Continued)

(58) Field of Classification Search
None
See application file for complete search history.

(56) References Cited

U.S. PATENT DOCUMENTS 8,670,595 B2     3/2014  Satoh
9,965,687 B2 *   5/2018  Loce ...................... G06V 20/52
(Continued)

FOREIGN PATENT DOCUMENTS

CN          102479436 A      5/2012
CN          109725010 A      5/2019
(Continued)

OTHER PUBLICATIONS

Office Action dated Oct. 10, 2025 for corresponding Chinese Application No. 202111617954.3 (20 pages including English Translation).
(Continued)

*Primary Examiner* — Amandeep Saini
*Assistant Examiner* — Caroline Tabancay Duffy
(74) *Attorney, Agent, or Firm* — Merchant & Gould P.C.

(57) ABSTRACT

Provided are a method and a device of binding security inspection information, an electronic apparatus and a storage medium, which may be applied to the field of security inspection technology. In the method of binding security inspection information of the present disclosure, the pedestrian detection frame is acquired by detecting the video stream, and each pedestrian detection frame has the coordinate information and the tracking information. According to the coordinate information and the tracking information of the pedestrian detection frame, the baggage security inspection information, the pedestrian security inspection information, and the identity information are bound to acquire all security inspection information of a detected person, so that a security inspection efficiency is improved.

11 Claims, 7 Drawing Sheets

(51) Int. Cl.

| | |
|---|---|
| *G06V 10/44* | (2022.01) |
| *G06V 10/74* | (2022.01) |
| *G06V 20/52* | (2022.01) |

(52) U.S. Cl.
CPC ............... *G06T 2207/30112* (2013.01); *G06T 2207/30196* (2013.01); *G06V 2201/07* (2022.01)

(56) References Cited

U.S. PATENT DOCUMENTS

| | | | | |
|---|---|---|---|---|
| 10,157,317 | B2 * | 12/2018 | Chen | H04N 21/2187 |
| 10,896,327 | B1 * | 1/2021 | Lablans | G06V 10/25 |
| 2004/0124982 | A1 | 7/2004 | Kovach | |
| 2012/0128214 | A1 | 5/2012 | Satoh | |
| 2018/0216957 | A1 | 8/2018 | Bekkerman et al. | |
| 2019/0180398 | A1 | 6/2019 | Chen et al. | |
| 2019/0333233 | A1 * | 10/2019 | Hu | G01S 13/04 |
| 2021/0082130 | A1 * | 3/2021 | Crain | G06T 7/60 |
| 2021/0287503 | A1 * | 9/2021 | Tarui | G08B 13/19608 |

FOREIGN PATENT DOCUMENTS

| | | | | | |
|---|---|---|---|---|---|
| CN | 109725011 | A | * | 5/2019 | B07C 3/02 |
| CN | 110309717 | A | | 10/2019 | |
| CN | 111601076 | A | * | 8/2020 | G06V 40/172 |
| CN | 111783915 | A | * | 10/2020 | G06Q 50/26 |
| CN | 111899258 | A | * | 11/2020 | |
| CN | 112015931 | A | | 12/2020 | |
| CN | 112100196 | A | | 12/2020 | |
| CN | 112131919 | A | * | 12/2020 | G06F 18/22 |
| CN | 112182270 | A | | 1/2021 | |
| CN | 112948615 | A | | 6/2021 | |
| CN | 112949577 | A | | 6/2021 | |
| CN | 113408405 | A | | 9/2021 | |
| CN | 113850990 | A | | 12/2021 | |

OTHER PUBLICATIONS

English Translation of International Search Report of corresponding PCT Application No. PCT/CN2022/127688 dated Jan. 17, 2023 (2 pages).

* cited by examiner

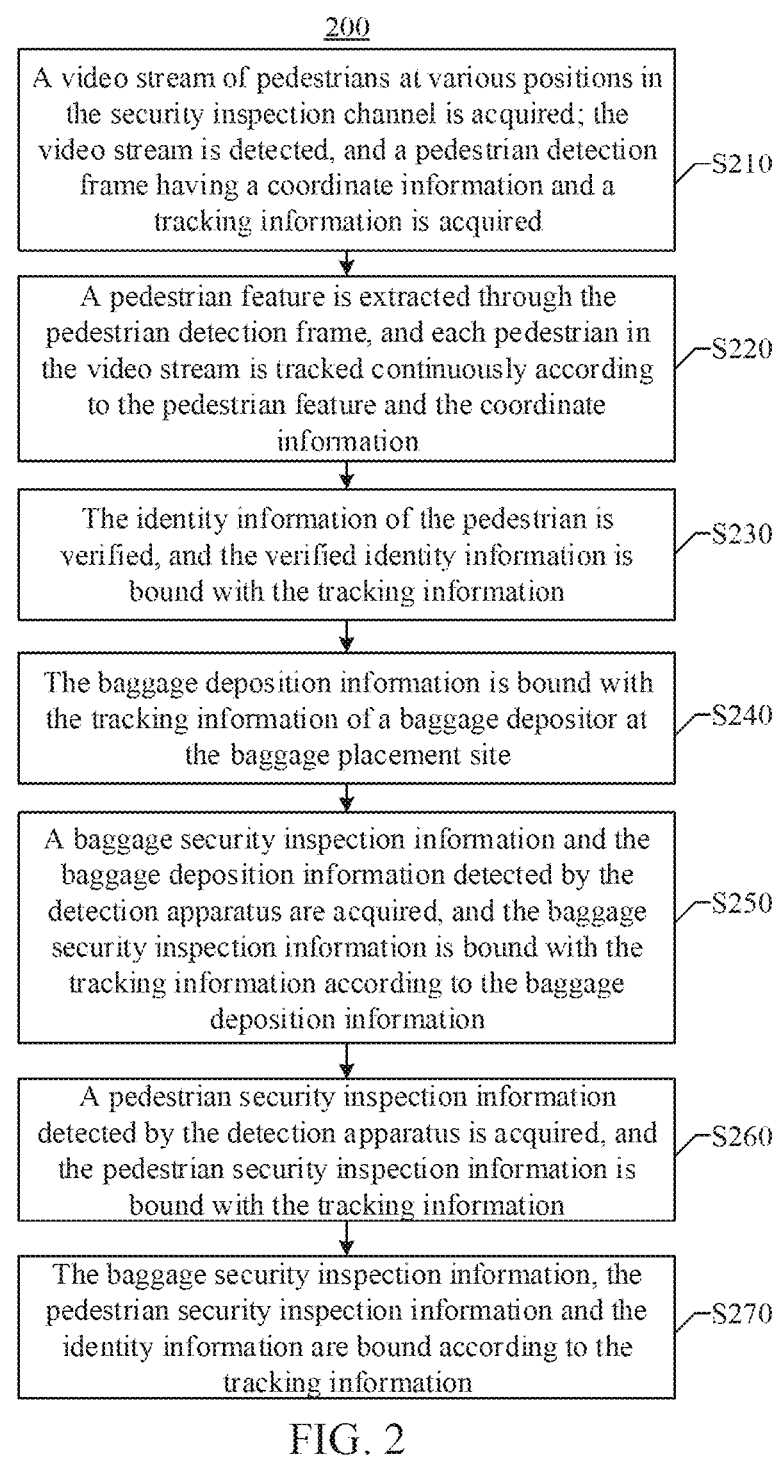

200

A video stream of pedestrians at various positions in
the security inspection channel is acquired; the
video stream is detected, and a pedestrian detection
frame having a coordinate information and a
tracking information is acquired — S210

A pedestrian feature is extracted through the
pedestrian detection frame, and each pedestrian in
the video stream is tracked continuously according
to the pedestrian feature and the coordinate
information — S220

The identity information of the pedestrian is
verified, and the verified identity information is
bound with the tracking information — S230

The baggage deposition information is bound with
the tracking information of a baggage depositor at
the baggage placement site — S240

A baggage security inspection information and the
baggage deposition information detected by the
detection apparatus are acquired, and the baggage
security inspection information is bound with the
tracking information according to the baggage
deposition information — S250

A pedestrian security inspection information
detected by the detection apparatus is acquired, and
the pedestrian security inspection information is
bound with the tracking information — S260

The baggage security inspection information, the
pedestrian security inspection information and the
identity information are bound according to the
tracking information — S270

FIG. 2

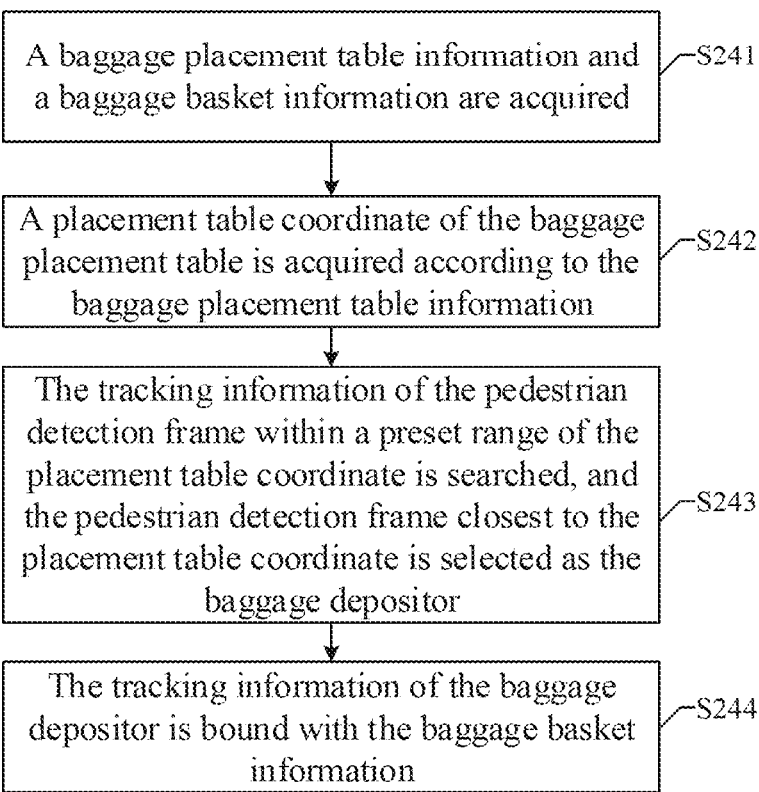

S240

A baggage placement table information and a baggage basket information are acquired ⟋—S241

A placement table coordinate of the baggage placement table is acquired according to the baggage placement table information ⟋—S242

The tracking information of the pedestrian detection frame within a preset range of the placement table coordinate is searched, and the pedestrian detection frame closest to the placement table coordinate is selected as the baggage depositor ⟋—S243

The tracking information of the baggage depositor is bound with the baggage basket information ⟋—S244

FIG. 3A

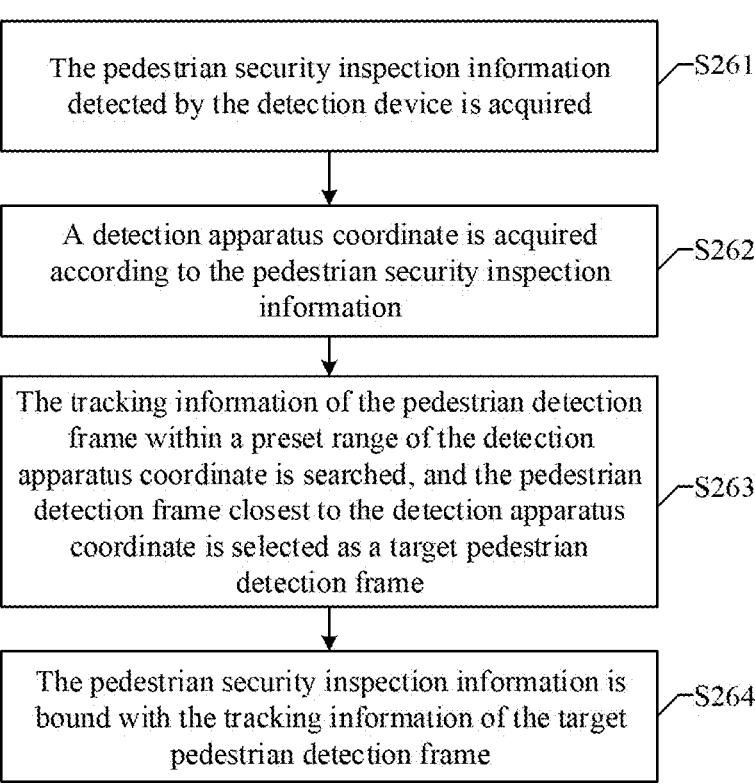

S260

The pedestrian security inspection information detected by the detection device is acquired ⟋⎯S261

A detection apparatus coordinate is acquired according to the pedestrian security inspection information ⟋⎯S262

The tracking information of the pedestrian detection frame within a preset range of the detection apparatus coordinate is searched, and the pedestrian detection frame closest to the detection apparatus coordinate is selected as a target pedestrian detection frame ⟋⎯S263

The pedestrian security inspection information is bound with the tracking information of the target pedestrian detection frame ⟋⎯S264

FIG. 3B

METHOD AND DEVICE OF BINDING SECURITY INSPECTION INFORMATION, ELECTRONIC APPARATUS, AND READABLE STORAGE MEDIUM

CROSS REFERENCE

This application claims priority to Chinese Patent Application No. 202111617954.3 filed on Dec. 27, 2021 in China National Intellectual Property Administration, the whole disclosure of which is incorporated herein by reference in its entirety.

TECHNICAL FIELD

The present disclosure relates to a field of security inspection technology, and in particular to a method and a device of binding security inspection information, an electronic apparatus, and a readable storage medium.

BACKGROUND

With the development of society, public security has become more and more important. Therefore, various public areas are provided with security devices and apparatuses to perform security inspection on pedestrians and baggage they carried so as to ensure the safety of public places and other areas. As an artificial intelligence technology has become more and more mature, it has also been applied to the field of security inspection. An application significance of the artificial intelligence technology is to improve user experiences, reduce unnecessary labor costs, and assign cumbersome work to a machine for execution, thereby improving a work efficiency and a work quality. One of important applications of the artificial intelligence technology in the field of security inspection technology is to use face recognition technology to realize passenger identity verification and information binding. For example, during an airport security inspection, when a passenger carrying baggage pass through a security inspection channel, the baggage is required to pass through a security inspection device, and the passenger is required to undergo an identity verification, while they are also required to go through a human body security inspection. At the same time, the security inspection information of the passengers' baggage is required to correspond to the passenger himself/herself, so as to achieve a real-time query of passenger security inspection information.

In the related art, a method based on face recognition is generally used to bind the passenger with the baggage. However, the method has an obvious disadvantage when the human face is blocked or the angle is inappropriate. For example, a recognition accuracy of the face recognition when the passenger wears a mask is lower than that a recognition accuracy when the passenger does not wear a mask, which leads to poor passenger-baggage binding effect and reduces a security inspection speed. A low security inspection speed affects a security inspection experience of the passenger especially when a security inspection traffic is large. In addition, only the binding of the passenger with the baggage security inspection information is achieved in the face-based security information binding used in the related art, and the binding of the passenger security information with the passenger identity is not achieved. During a security inspection information query, it is impossible to query all information of the passenger security inspection, resulting in incomplete security inspection information.

SUMMARY

In view of the above-mentioned problems, the present disclosure provides a method and device of binding security inspection information, an electronic apparatus, and a readable storage medium, which may effectively solve the above-mentioned problems and defects in the related art.

According to a first aspect of the present disclosure, a method of binding security inspection information is provided, including: acquiring a video stream of pedestrians at each position in a security inspection channel, detecting the video stream to acquire a pedestrian detection frame, wherein the pedestrian detection frame has a coordinate information and a tracking information; extracting a pedestrian feature through the pedestrian detection frame, and continuously tracking each pedestrian in the video stream according to the pedestrian feature and the coordinate information; verifying an identity information of a pedestrian, and binding the verified identity information with the tracking information; binding a baggage deposition information with the tracking information of a baggage depositor at a baggage placement site; acquiring a baggage security inspection information and the baggage deposition information detected by a detection apparatus, and binding the baggage security inspection information with the tracking information according to the baggage deposition information; acquiring a pedestrian security inspection information detected by the detection apparatus, and binding the pedestrian security inspection information with the tracking information; and binding the baggage security inspection information, the pedestrian security inspection information and the identity information according to the tracking information.

In some embodiments of the present disclosure, the coordinate information is converted from a global coordinate system where the security inspection channel is located and a relative coordinate system where the detection apparatus is located, and wherein the coordinate information includes an x-axis coordinate and a y-axis coordinate that are parallel to a horizontal plane and perpendicular to each other, and a z-axis coordinate perpendicular to the horizontal plane, and the coordinate information is acquired by a depth image calculation.

In some embodiments of the present disclosure, the detection apparatus includes at least one of an identity verification device, a camera device, a human body security inspection device, a baggage placement device and a baggage security inspection device.

In some embodiments of the present disclosure, the extracting a pedestrian feature through the pedestrian detection frame includes: intercepting a pedestrian image on a visible light image of the video stream by using the pedestrian detection frame, and extracting a pedestrian feature of the pedestrian image by using a feature extraction network.

In some embodiments of the present disclosure, the video stream is acquired through at least one camera, wherein the continuously tracking each pedestrian in the video stream according to the pedestrian feature and the coordinate information includes: continuously tracking each pedestrian in a single-camera video stream, and continuously tracking each pedestrian in a multi-camera video stream.

In some embodiments of the present disclosure, the continuously tracking each pedestrian in a single-camera video stream includes: matching and associating the pedestrian detection frame of a current frame in the single-camera video stream with pedestrian detection frames of adjacent frames in the single-camera video stream to continuously track each pedestrian, wherein the pedestrian features of the matched and associated pedestrian detection frame of the current frame and pedestrian detection frames of adjacent frames meet a preset feature similarity, and the coordinate information of the matched and associated pedestrian detection frame of the current frame and pedestrian detection frames of adjacent frames meets a preset distance.

In some embodiments of the present disclosure, the continuously tracking each pedestrian in a multi-camera video stream includes: matching and associating pedestrian detection frames having a same tracking information in a same time period in video streams shot by different cameras to continuously track each pedestrian, wherein the pedestrian features of the matched and associated pedestrian detection frames meet a preset feature similarity, and the coordinate information of the matched and associated pedestrian detection frames meets a preset distance.

In some embodiments of the present disclosure, the baggage deposition information includes a baggage placement table information and a baggage basket information, and wherein the binding a baggage deposition information with the tracking information of a baggage depositor at a baggage placement site includes: acquiring a baggage placement table information and a baggage basket information; acquiring a placement table coordinate of the baggage placement table according to the baggage placement table information; searching the tracking information of the pedestrian detection frame within a preset range of the placement table coordinate, and selecting the pedestrian detection frame closest to the placement table coordinate as the baggage depositor; and binding the tracking information of the baggage depositor with the baggage basket information.

In some embodiments of the present disclosure, the acquiring a baggage security inspection information and the baggage deposition information detected by a detection apparatus, and binding the baggage security inspection information with the tracking information according to the baggage deposition information includes: performing a ray irradiation on the baggage through the detection apparatus to generate the baggage security inspection information, wherein the baggage security inspection information includes a ray radiation image; performing a ray irradiation on the baggage basket through the detection apparatus, acquiring a ray radiation image of the baggage basket, processing the ray radiation image of the baggage basket and acquiring the baggage basket information; and binding the tracking information bound with the baggage basket with the baggage security inspection information.

In some embodiments of the present disclosure, the acquiring a pedestrian security inspection information detected by the detection apparatus, and binding the pedestrian security inspection information with the tracking information includes: acquiring the pedestrian security inspection information detected by the detection apparatus; acquiring a coordinate of the detection apparatus according to the pedestrian security inspection information; searching the tracking information of the pedestrian detection frame within a preset range of the coordinate of the detection apparatus, and selecting the pedestrian detection frame closest to the coordinate of the detection apparatus as a target pedestrian detection frame; and binding the pedestrian security inspection information with the tracking information of the target pedestrian detection frame.

According to a second aspect of the embodiments of the present disclosure, a device of binding security inspection information is provided, including: an acquisition module configured to acquire a video stream of pedestrians at each position in a security inspection channel, detect the video stream to acquire a pedestrian detection frame, wherein the pedestrian detection frame has a coordinate information and a tracking information; a tracking module configured to extract a pedestrian feature through the pedestrian detection frame, and continuously track each pedestrian in the video stream according to the pedestrian feature and the coordinate information; a first binding module configured to verify an identity information of a pedestrian, and bind the verified identity information with the tracking information; a second binding module configured to bind a baggage deposition information with the tracking information of a baggage depositor at a baggage placement site; a third binding module configured to acquire a baggage security inspection information and the baggage deposition information detected by a detection apparatus, and bind the baggage security inspection information with the tracking information according to the baggage deposition information; a fourth binding module configured to acquire a pedestrian security inspection information detected by the detection apparatus, and bind the pedestrian security inspection information with the tracking information; and a fifth binding module configured to bind the baggage security inspection information, the pedestrian security inspection information and the identity information according to the tracking information.

According to a third aspect of the embodiments of the present disclosure, an electronic apparatus is provided, including: one or more processors; and a storage device for storing executable instructions, wherein the executable instructions, when being executed by the processor, implement the method described above.

According to a fourth aspect of the embodiments of the present disclosure, a computer-readable storage medium having executable instructions thereon is provided, wherein the instructions, when being executed by a processor, implement the method described above.

According to the embodiments of the present disclosure, the pedestrian detection frame is acquired by detecting the video stream, and each pedestrian detection frame has the coordinate information and the tracking information. According to the coordinate information and the tracking information of the pedestrian detection frame, the baggage security inspection information, the pedestrian security inspection information and the identity information are bound to acquire all security information of the detected person, so that a security inspection efficiency is improved.

BRIEF DESCRIPTION OF THE DRAWINGS

The above contents and other objectives, features and advantages of the present disclosure will be more apparent through the following descriptions of the embodiments of the present disclosure with reference to the accompanying drawings, in which:

FIG. 2 schematically shows an execution flow chart of a method of binding security inspection information according to the embodiments of the present disclosure.

FIG. 3A schematically shows a specific flow of an operation S240 in a method of binding security inspection information according to the embodiments of the present disclosure.

FIG. 3B schematically shows a specific flow of an operation S260 in a method of binding security inspection information according to embodiments of the present disclosure.

DETAILED DESCRIPTION OF EMBODIMENTS

Figure 1:
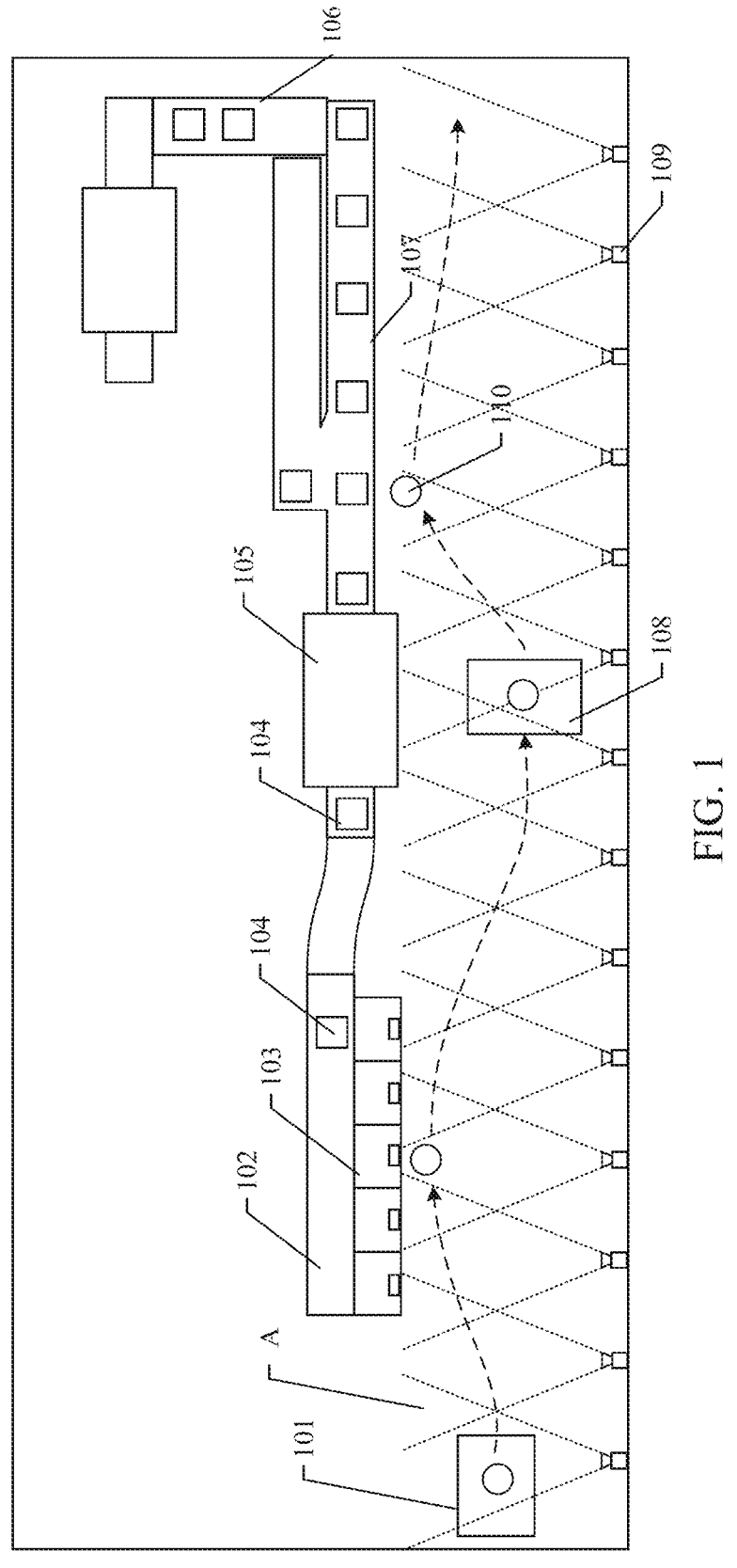
FIG. 1 schematically shows an application scenario diagram of a method of binding security inspection information according to the embodiments of the present disclosure.

Embodiments of the present disclosure will be described below with reference to the accompanying drawings. However, it should be understood that these descriptions are merely exemplary and are not intended to limit the scope of the present disclosure. In the following detailed descriptions, for purposes of explanation, numerous specific details are set forth in order to provide a comprehensive understanding of the embodiments of the present disclosure. However, it is obvious that one or more embodiments may be implemented without these specific details. In addition, in the following descriptions, descriptions of well-known structures and technologies are omitted to avoid unnecessarily obscuring the concept of the present disclosure.

Terms used herein are for the purpose of describing the embodiments only and are not intended to limit the present disclosure. Terms "comprising", "including" and the like used herein specify a presence of a feature, a step, an operation and/or a component, but do not preclude a presence or addition of one or more other features, steps, operations, or components.

All terms (including technical and scientific terms) used herein have the same meaning as commonly understood by those skilled in the art, unless otherwise defined. It should be noted that the terms used herein should be construed as having meanings consistent with the context of the present description and should not be construed in an idealized or overly rigid manner.

In the embodiments of the present disclosure, the term "security inspection channel" refers to a region where a pedestrian undergoes a security inspection. The pedestrian may pass through the security inspection channel to realize a security inspection of the pedestrian, or the pedestrian may place the baggage at a baggage placement site in the security inspection channel to achieve a security inspection of baggage. Various detection apparatuses, such as an identity verification device, a camera device, a human body security inspection device, a baggage placement device, a baggage security inspection device, a conveyor device, etc., may be provided in the security inspection channel for positioning or inspecting the pedestrian or the baggage.

The embodiments of the present disclosure provide a method of binding security inspection information, including: a video stream of pedestrians at various positions in the security inspection channel is acquired, the video stream is detected, and a pedestrian detection frame having a coordinate information and a tracking information is acquired; a pedestrian feature is extracted through the pedestrian detection frame, and each pedestrian in the video stream is continuously tracked according to the pedestrian feature and the coordinate information; an identity information of the pedestrian is verified, and the verified identity information is bound with the tracking information; a baggage deposition information is bound with a tracking information of a baggage depositor at a baggage placement site; a baggage security inspection information and the baggage deposition information detected by a detection apparatus are acquired, and the baggage security inspection information is bound with the tracking information according to the baggage deposition information; a pedestrian security inspection information detected by the detection apparatus is acquired, and the pedestrian security inspection information is bound with the tracking information; and the baggage security inspection information, the pedestrian security inspection information and the identity information are bound according to the tracking information.

According to the embodiments of the present disclosure, the pedestrian detection frame is acquired by detecting the video stream, and each pedestrian detection frame has the coordinate information and the tracking information. According to the coordinate information and the tracking information of the pedestrian detection frame, the baggage security inspection information, the pedestrian security inspection information, and the identity information are bound to acquire all security inspection information of a detected person, so that a security inspection efficiency is improved.

The method of binding security inspection information of the embodiments of the present disclosure is described in detail below with reference to FIG. 1 to FIG. 4.

FIG. 1 schematically shows an application scenario diagram of a method of binding security inspection information according to the embodiments of the present disclosure.

As shown in FIG. 1, the method of binding security inspection information is mainly used in areas or places where a security inspection is required, such as an airport, a subway station, a railway station, and other public transport areas. In the embodiment, an application scenario may be a security inspection channel of a railway station. The security inspection channel is provided with an identity verification device 101, a baggage placement device (including a conveyor belt 102, a baggage placement table 103, and a baggage basket 104), a baggage security inspection device 105, a baggage basket recycle device 106, a baggage collection site 107, a human body security inspection device 108, and a camera 109. A pedestrian 110 moves in the security inspection channel in a direction indicated by a dotted arrow to complete a process of identity verification, baggage placement, baggage security inspection, human body security inspection and baggage collection in sequence.

In an exemplary application scenario of the present disclosure, the identity verification device 101 is used to verify the identity information of the pedestrian 110, and allow the pedestrian 110 to enter the security inspection channel after the identity information is verified. For example, the identity verification device 101 may be a gate or the like, which has a face recognition function, an identity card scanning function, an air ticket inspection function, a rail ticket inspection function, etc. The conveyor belt 102 is used to convey the baggage and other articles placed on the conveyor belt by the pedestrian. The baggage placement table 103 is used to indicate where the pedestrian should place the baggage and other articles. After entering the security inspection channel, the pedestrian first obtains the baggage basket 104 from a location of a baggage basket deposition site, and then puts the baggage into the baggage basket 104. The baggage basket 104 is placed on the baggage placement table 103, so that the conveyor 102 may transfer the baggage basket 104 with the baggage to the baggage security inspection device 105 for security inspection. The pedestrian 110 passes through the human body security inspection device 108 to undergo the human body security inspection. After the security inspection is completed (i.e., after the baggage security inspection and the human body security inspection are completed), the pedestrian 110 arrives at the baggage collection site 107 to collect the inspected baggage from the baggage basket. The empty baggage basket 104 is transferred by the conveyor belt to the baggage basket recycle device 106 for recycling. The camera 109 is used to monitor the security inspection channel and form a video stream. A plurality of cameras 109 are provided to respectively monitor different positions of the security inspection channel. Monitoring regions shot by two adjacent cameras 109 have a certain overlapping region. As shown in FIG. 1, an overlapping region A in FIG. 1 is an overlapping region of shooting regions of two adjacent cameras. By proving the overlapping region, a continuous tracking and monitoring of the pedestrian in the video stream between different cameras is achieved. The monitoring regions of the cameras 109 cover the entire security inspection channel without dead corners, so that pedestrians at various positions in the security inspection channel are monitored, and a video stream of the pedestrians at various positions is formed.

In the embodiments of the present disclosure, the overlapping region of adjacent camera monitoring regions may be set to, for example, 10% or more, to ensure the effect of continuous tracking of the pedestrian. For example, the camera 109 may use a depth camera to collect a depth information between the pedestrian and the camera in the security inspection channel for obtaining a coordinate of the pedestrian in the security inspection channel. For example, an installation height of the camera 109 may be 3 m, and for example, an installation tilt angle of the camera 109 may be set to 45 degrees, which may not only provide a better video capture for the pedestrian, but may also expand a shooting range. In other embodiments of the present disclosure, the installation height and the shooting angle of the camera 109 may be set according to actual needs so as to better meet installation requirements.

FIG. 2 schematically shows an execution flow chart of a method of binding security inspection information according to the embodiments of the present disclosure.

As shown in FIG. 2, a flow 200 of a method of binding security inspection information in an embodiment of the present disclosure includes operation S210 to operation S270.

In operation S210, a video stream of pedestrians at various positions in the security inspection channel is acquired; the video stream is detected, and a pedestrian detection frame having a coordinate information and a tracking information is acquired.

In the embodiments of the present disclosure, the video stream is captured by the plurality of cameras provided in the security inspection channel, and pedestrians entering a camera shooting range will be monitored. By acquiring the video stream of pedestrians at various positions in the security inspection channel, the tracking and monitoring of pedestrians in the entire security inspection channel may be realized. After acquiring the video stream of pedestrians at various positions in the security inspection channel, the video stream is detected to acquire the pedestrian detection frame.

In the embodiments of the present disclosure, each pedestrian detection frame has a coordinate information. When the pedestrian moves, the coordinate information of the pedestrian detection frame is updated in real time according to a position of the pedestrian detection frame acquired by the camera.

When the pedestrian enters a shooting range of the camera, after the pedestrian detection frame is acquired by detecting the pedestrian, a tracking information is allocated to each pedestrian detection frame. Each pedestrian detection frame has a same tracking information in the video stream formed by different cameras, that is, a specific pedestrian has a recognizable global tracking information in the entire video stream. The tracking information is a specific tracking information relative to the pedestrian.

In the embodiments of the present disclosure, the coordinate information is converted from a global coordinate system where the security inspection channel is located and a relative coordinate system where the detection apparatus is located. The coordinate information includes an x-axis coordinate and a y-axis coordinate that are parallel to a horizontal plane and perpendicular to each other, and a x-axis coordinate perpendicular to the horizontal plane, and the coordinate information is acquired by a depth image calculation. The coordinate information is calculated from the depth image. The x-axis and y-axis coordinates are the coordinate information of the pedestrian in the global coordinate system. A moving track of the pedestrian detection frame may be acquired according to the coordinate information, so that a tracking of the pedestrian is realized. The x-axis and y-axis coordinates are converted from a relative coordinate information acquired by the depth camera. The conversion method uses conversion parameters described below for calculation.

In the embodiments of the present disclosure, the security inspection channel has a global coordinate system. For example, a point at an entrance of the security inspection channel is used as an origin of the global coordinate system to establish the global coordinate system. Detection apparatuses in the security inspection channel are located at different coordinates on the global coordinate system and each has its own coordinate information. According to the coordinate information of the detection apparatus in the global coordinate system, the positioning of each detection apparatus may be achieved. Each detection apparatus has its own relative coordinate system, which is used to detect the pedestrian detection frame to acquire real-time coordinate information of the pedestrian. For example, taking the depth camera as an example, in a process of the depth camera forming a video stream, each pedestrian detection frame detected by the depth camera has a relative coordinate information in the relative coordinate system where the camera is located. The relative coordinate information may feed back a movement track of the pedestrian detection frame relative to the camera in real time, which facilitates tracking the pedestrian. When detecting the pedestrian detection frame, it is necessary to convert the relative coordinate information of the pedestrian detection frame in the relative coordinate system into the global coordinate information in the global coordinate system. The global coordinate information of the depth camera (such as the specific coordinate of each depth camera) in the global coordinate system may be acquired, then the relative coordinate information of the pedestrian detection frame in the depth camera may be acquired, and then the relative coordinate information in the relative coordinate system may be converted into the global coordinate information in the global coordinate system through a preset conversion parameter.

In the embodiments of the present disclosure, the detection apparatus includes at least one of an identity verification device, a camera device, a human body security inspection device, a baggage placement device and a baggage security inspection device. Before a calculation of the conversion parameter, it is further necessary to calibrate and register a plurality of depth cameras. For example, coordinates of the identity verification device, the human body security inspection device, the baggage placement device, the baggage security inspection device and other detection apparatuses in the global coordinate system are acquired, and then coordinates of other detection apparatuses in the relative coordinate system where the depth camera is located may be acquired, the relative coordinate information and the global coordinate information of the detection apparatus at a same spatial position may be calibrated and registered. In the embodiments of the present disclosure, the calculation of the conversion parameter may be achieved, for example, by using the least square algorithm.

In the embodiments of the present disclosure, the video stream may be detected. For example, Yolov4 target detection algorithm may be used to detect the pedestrian in the video stream shot by the plurality of cameras so as to acquire the pedestrian detection frame. Each pedestrian detection frame represents a pedestrian.

In operation S220, a pedestrian feature is extracted through the pedestrian detection frame, and each pedestrian in the video stream is tracked continuously according to the pedestrian feature and the coordinate information.

In the embodiments of the present disclosure, a pedestrian feature being extracted through the pedestrian detection frame includes: a pedestrian feature of a pedestrian image is extracted through a feature extraction network by using the pedestrian detection frame to intercept a pedestrian image on a visible light image of the video stream.

For example, the pedestrian detection frame has a visible light image, i.e., an image information, in the video stream. The pedestrian image in the pedestrian detection frame to extract the pedestrian feature is intercepted, the image information of the pedestrian is acquired, and then the pedestrian feature of the pedestrian image is extracted through the feature extraction network. For example, the intercepted pedestrian image is imported into the mobile etv3 network to extract an appearance feature to obtain the pedestrian feature, which includes 1*512 floating numbers. In other optional embodiments, other types of feature extraction networks may also be used for feature extraction.

In the embodiments of the present disclosure, the video stream is acquired through at least one camera, such as a depth camera. In addition, when a pedestrian moves beyond a monitoring range of one camera and enters a monitoring range of another camera, the pedestrian may be monitored by the another camera. The video stream may also be formed by a plurality of cameras, that is, the pedestrian continues to be tracked across cameras, so as to achieve continuous tracking of each pedestrian.

The continuous tracking of each pedestrian in the video stream according to the pedestrian feature and the coordinate information includes: continuously tracking each pedestrian in a single-camera video stream and continuously tracking each pedestrian in a multi-camera video stream.

The continuously tracking each pedestrian in a single-camera video stream includes: matching and associating a pedestrian detection frame of a current frame in the single-camera video stream with pedestrian detection frames of adjacent frames in the single-camera video stream to continuously track each pedestrian, wherein the pedestrian features of the matched and associated pedestrian detection frame of the current frame and pedestrian detection frames of adjacent frames meet a preset feature similarity, and the coordinate information of the matched and associated pedestrian detection frame of the current frame and pedestrian detection frames of adjacent frames meets a preset distance.

For example, when continuously tracking each pedestrian in a single camera video stream, the pedestrian detection frame in each frame of the video stream is analyzed, and the pedestrian detection frames belonging to the same pedestrian are matched and associated in different frames according to the coordinate information and pedestrian features of the pedestrian detection frames in adjacent frames, so as to achieve the continuous tracking of the pedestrian. For example, by acquiring the pedestrian features of the pedestrian detection frames, and judging the pedestrian features of the pedestrian detection frames of the adjacent frames through a similarity criterion, it is considered that the pedestrian detection frames of the adjacent frames indicate the same pedestrian when the coordinate information of the pedestrian detection frames of the adjacent frames meet a preset distance and the pedestrian features meet a preset similarity. The preset distance may be a preset distance range, that is, a distance between center points of the pedestrian detection frames of the adjacent frames is within a preset range (such as 0.5 in). The preset similarity may be a preset value. When a similarity of pedestrian features of the pedestrian detection frames of the adjacent frames exceeds the preset value (such as 90%), the preset similarity is considered to be satisfied. In the embodiments of the present disclosure, for example, the method of matching and associating may select the Hungarian assignment method.

The continuously tracking each pedestrian in a multi-camera video stream includes: matching and associating pedestrian detection frames having a same tracking information in a same time period in video streams shot by different cameras to continuously track each pedestrian, wherein the pedestrian features of the matched and associated pedestrian detection frames meet a preset feature similarity, and the coordinate information meets a preset distance.

For example, each pedestrian is tracked continuously in the multi-camera video stream, that is, the pedestrian is tracked between cameras having an overlapping monitoring region. The video streams acquired by each camera have a same time axis, and each pedestrian detection frame has different tracking information. The same pedestrian detection frame between different cameras has the same tracking information. At the same time axis position, when the pedestrian features of the pedestrian detection frames in the overlapping region in the video streams of different cameras meet the preset feature similarity, and the coordinate information thereof meets the preset distance, it is considered that the pedestrian detection frames in the overlapping region belong to the same pedestrian detection frame, so as to match and associate the pedestrian detection frames in different cameras. For example, if a similarity of pedestrian features of the pedestrian detection frames in the overlapping region of different cameras exceeds a preset value (such as 90%), and a distance between the center points of the pedestrian detection frames in the overlapping region of different cameras is within a preset range (such as 0.5 m), it is considered that the pedestrian detection frames in the overlapping region of different cameras are the same pedestrian detection frame, and then the pedestrian detection frames are matched and associated. For example, the method of matching and associating, for example, may select the Hungarian assignment method, so that the pedestrian may be continuously tracked across cameras.

In operation S230, the identity information of the pedestrian is verified, and the verified identity information is bound with the tracking information.

In the embodiments of the present disclosure, as shown in FIG. 1, after the pedestrian arrives at the identity verification device 101, the pedestrian's identity information is verified. For example, the identity verification device may be a gate. After the identity is verified, the identity information is bound with the tracking information.

In the embodiments of the present disclosure, after the identity information is verified, the pedestrian's identity information is sent to a tracking server to facilitate the binding of the identity information with the tracking information.

For example, the identity verification device 101 has a coordinate in the global coordinate system where the security inspection channel is located. After the pedestrian identity information is verified, the coordinate of the identity verification device 101 is acquired, and the tracking information of the pedestrian detection frame within a certain range of the coordinate of the identity verification device 101 is searched. If more than one tracking information is present, the tracking information closest to the identity verification device 101 is selected for binding with the identity information. The distance range of the coordinate of the identity verification device 101 may be 0.5 m. In other embodiments, the distance range may be adjusted according to actual needs. After the pedestrian identity information is verified, the pedestrian goes to the baggage placement site to place the baggage.

In operation S240, the baggage deposition information is bound with the tracking information of a baggage depositor at the baggage placement site.

FIG. 3A schematically shows a specific flow of an operation S240 in a method of binding security inspection information according to embodiments of the present disclosure.

As shown in FIG. 3A, the operation S240 includes operation S241 to operation S244.

In operation S241, a baggage placement table information and a baggage basket information are acquired.

In the embodiments of the present disclosure, the baggage deposition information includes the baggage placement table information and the baggage basket information. After arriving at the baggage placement site, the pedestrian is required to take out the baggage basket from a specific position and place the baggage basket on the baggage placement table. The baggage placement table has a baggage placement table information, such as a baggage placement table number. The baggage basket has a baggage basket information, such as a baggage basket number. After the pedestrian places the baggage basket on the baggage placement table, the baggage basket information and the baggage placement table information are acquired by, for example, through RFID technology scanning. In the embodiments of the present disclosure, the baggage basket number and/or the baggage placement table number identified by RFID scanning technology are sent to the tracking server. After the baggage basket number and/or the baggage placement table number are acquired by the tracking server, it is convenient to bind the baggage basket number and/or the baggage placement table number with the tracking information.

After the baggage placement table information and the baggage basket information are acquired, operation S242 is performed. In operation S242, a placement table coordinate of the baggage placement table is acquired according to the baggage placement table information.

In the embodiments of the present disclosure, there are a plurality of baggage placement tables, and each baggage placement table has a coordinate in the global coordinate system where the security inspection channel is located. The position of the baggage placement table may be acquired according to the coordinate of each baggage placement table. Each baggage placement table information (e.g., the baggage placement table number) corresponds to the coordinate of the baggage placement table. After acquiring the baggage placement table information, the coordinate of the baggage placement table may be acquired through a stored corresponding relationship between the baggage placement table information and the coordinate of the baggage placement table.

In operation S243, the tracking information of the pedestrian detection frame within a preset range of the placement table coordinate is searched, and the pedestrian detection frame closest to the placement table coordinate is selected as the baggage depositor.

For example, after acquiring the coordinate of the baggage placement table, the tracking information of the pedestrian detection frame within the preset range of the placement table coordinate is searched. For example, the preset range may be 0.5 m. If there are more than one tracking information, the pedestrian detection frame closest to the placement table coordinate is selected as the baggage depositor. In other optional embodiments, the preset range may be adjusted according to actual needs.

In operation S244, the tracking information of the baggage depositor is bound with the baggage basket information.

For example, after the baggage depositor is determined, the tracking information of the pedestrian detection frame corresponding to the baggage depositor may be acquired. The tracking information is acquired according to the placement table coordinate, and the placement table coordinate corresponds to the baggage placement table information and the baggage basket information, so that the baggage basket information may be acquired and the baggage basket information may be bound with the tracking information. Thus, after acquiring the baggage basket information (such as the baggage basket number), the tracking information of the pedestrian detection frame may be acquired, and the baggage depositor corresponding to the baggage basket may be determined.

After the baggage basket information and/or the baggage placement table information are acquired by the tracking server, the tracking information of the pedestrian detection frame is acquired according to the baggage placement table coordinate. The baggage placement table information is bound with the tracking information of the baggage depositor, so that the baggage basket information is bound with the tracking information of the baggage depositor.

In operation S250, a baggage security inspection information and the baggage deposition information detected by the detection apparatus are acquired, and the baggage security inspection information is bound with the tracking information according to the baggage deposition information.

For example, the pedestrian takes out the baggage basket, places the baggage in the baggage basket, and then places the baggage basket on the baggage placement table. The baggage basket is conveyed to the baggage security inspection device via the conveyor belt. A ray irradiation is performed on the baggage in the baggage basket and the like, and the baggage security inspection information is generated. The baggage security inspection information includes a ray radiation image. For example, X-ray is used to irradiate the baggage to generate an X-ray image.

In the embodiments of the present disclosure, when the ray irradiation is performed on the baggage in the baggage basket, the baggage basket is also irradiated, and a ray radiation image of the baggage basket may be acquired. The ray radiation image of the baggage basket is processed to acquire the baggage basket information.

For example, the baggage basket is irradiated by the X-ray baggage security inspection device to acquire the X-ray image of the baggage basket. The X-ray image of the baggage basket is uploaded to a background system. The X-ray image is sent to a character recognition server by the background system, and a character recognition technology is used to identify the baggage basket number on the received X-ray image. The recognition process is as follows: first, the X-ray image is binarized, a connected domain detection is performed on the binarized image, and a position of the baggage basket number is acquired; then, an image of a rectangular area where the baggage basket number is located is intercepted for character segmentation; finally, the segmented characters are recognized using a pretrained SVM character recognition model, and thereby the baggage basket number is acquired.

Next, the tracking information bound with the baggage basket is bound with the baggage security inspection information. The tracking information bound with the baggage basket information in operation S244 is acquired, and the tracking information is bound with the baggage security inspection information, so that a binding of the pedestrian with the baggage security inspection information is realized.

In operation S260, a pedestrian security inspection information detected by the detection apparatus is acquired, and the pedestrian security inspection information is bound with the tracking information.

FIG. 3B schematically shows a specific flow of an operation S260 in a method of binding security inspection information according to the embodiments of the present disclosure.

As shown in FIG. 3B, the operation S260 includes operation S261 to operation S264.

In operation S261, the pedestrian security inspection information detected by the detection device is acquired.

After the pedestrian passes through the human body security inspection device and completes the security inspection, the pedestrian security inspection information is sent to the tracking server. After the pedestrian security inspection information is acquired by the tracking server, the pedestrian security inspection information is bound with the tracking information.

In operation S262, a detection apparatus coordinate is acquired according to the pedestrian security inspection information.

The detection apparatus has a coordinate in the global coordinate system where the security inspection channel is located. After the pedestrian passes the security inspection, the detection apparatus coordinate is acquired according to the pedestrian security inspection information, that is, the detection apparatus coordinate is the coordinate of the apparatus completing the security inspection for the pedestrian.

In operation S263, the tracking information of the pedestrian detection frame within a preset range of the detection apparatus coordinate is searched, and the pedestrian detection frame closest to the detection apparatus coordinate is selected as a target pedestrian detection frame.

According to the acquired coordinate of the detection apparatus, the tracking information of the pedestrian detection frame within the preset range of the coordinate of the detection device is searched. For example, the setting range may be 0.5 m. If there is tracking information of a plurality of pedestrian detection frames within the range, the pedestrian detection frame closest to the coordinate of the detection device is selected as the target pedestrian detection frame.

In operation S264, the pedestrian security inspection information is bound with the tracking information of the target pedestrian detection frame.

The tracking information of the target pedestrian detection frame is acquired according to the target pedestrian detection frame acquired in operation S263, and the tracking information is bound with the pedestrian security inspection information.

In operation S270, the baggage security inspection information, the pedestrian security inspection information and the identity information are bound according to the tracking information.

After the pedestrian passes through the security channel and completes a process of identity information verification, baggage security inspection and human body security inspection, the tracking server acquires the pedestrian identity information, the baggage security inspection information and pedestrian security inspection information, the baggage security inspection information, the pedestrian security inspection information and the identity information are bound through the tracking information described above, and a result is uploaded to the tracking server for storage. When the pedestrian security inspection information or the baggage security inspection information is abnormal, the pedestrian may be quickly positioned. In addition, the method of binding security inspection information may achieve fast and accurate security information binding.

Figure 4:
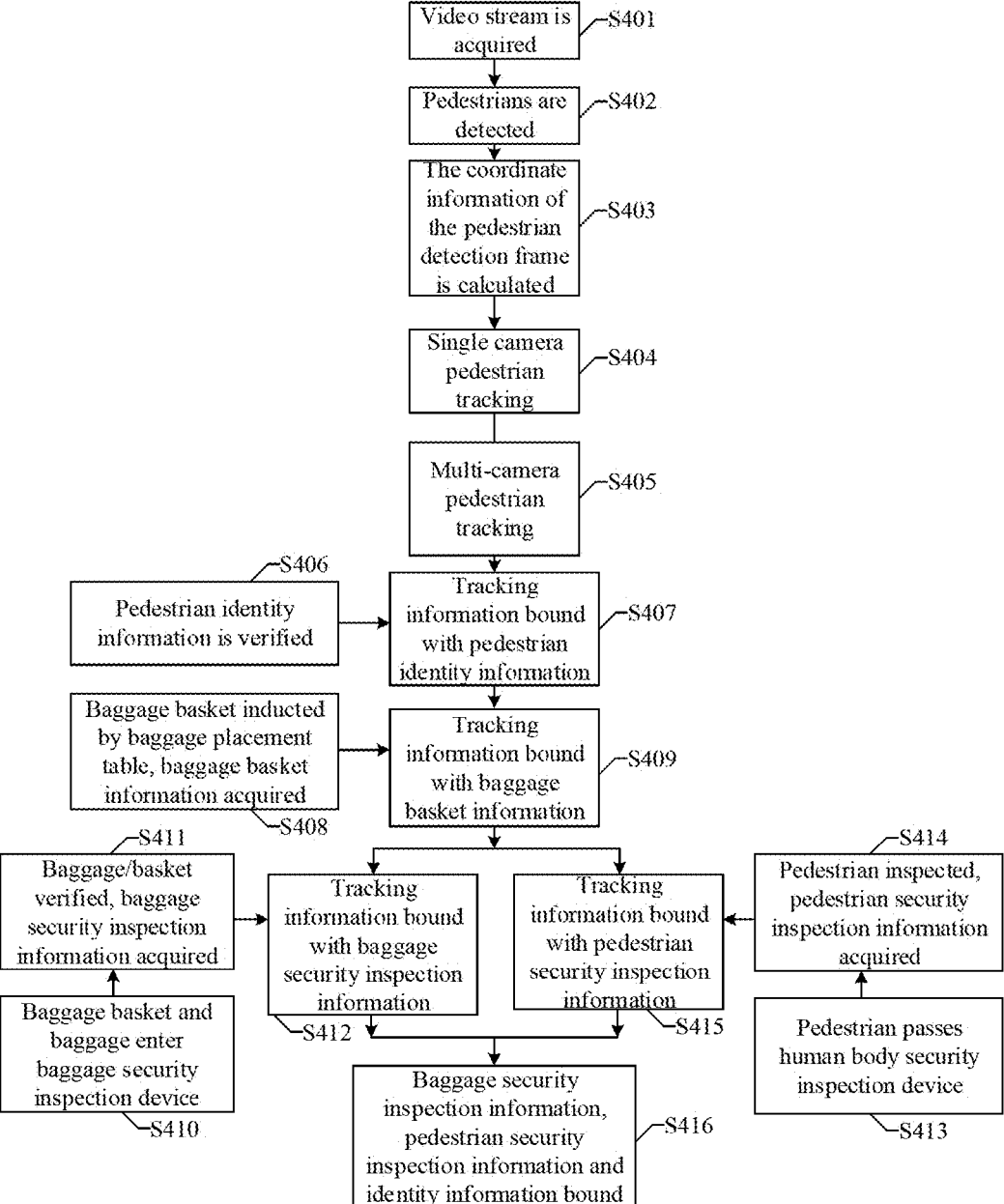
FIG. 4 schematically shows a complete execution flow chart of a method of binding security inspection information according to the embodiments of the present disclosure.

FIG. 4 schematically shows a complete execution flow chart of a method of binding security inspection information according to the embodiments of the present disclosure.

In order to make the method of binding security inspection information in the present disclosure more apparent, the complete execution flow of the method of binding security inspection information in the embodiments of the present disclosure is described below in detail in combination with FIG. 4.

The complete execution flow includes operation S401 to operation S416.

In operation S401, a video stream is acquired, wherein the video stream is acquired by a depth camera provided in the security inspection channel.

In operation S402, pedestrians in the video stream are detected. There are a plurality of pedestrians in the video stream. The pedestrian detection frame is acquired by detecting each pedestrian in the video stream.

In operation S403, the coordinate information of the pedestrian detection frame is calculated. The coordinate information of the pedestrian detection frame is converted from the global coordinate system where the security inspection channel is located and the relative coordinate system of the depth camera.

In operation S404, the pedestrian in the video stream is tracked in a single camera.

In operation S405, the pedestrian in the video stream is tracked in a multi-camera. For example, when the pedestrian moves out of a monitoring area of a camera, the pedestrian is tracked by another camera having an overlapping region with the camera to achieve the continuous tracking of the pedestrian across cameras.

In operation S406, the pedestrian arrives at the identity verification device, and the identity information of the pedestrian is verified.

In operation S407, after the identity information of the pedestrian is verified, the tracking information corresponding to the pedestrian detection frame is bound with the identity information of the pedestrian. The binding method is as described above.

In operation S408, the pedestrian arrives at the baggage placement device, places the baggage in the baggage basket, and places the baggage basket on the baggage placement table. The baggage basket information (such as the baggage basket number) and the baggage placement table number are acquired through the RFID technology.

In operation S409, the tracking information is bound with the baggage basket information according to the acquired baggage basket information. The binding method is as described above.

In operation S410, the baggage basket and the baggage are conveyed to the baggage security inspection device by the conveyor.

In operation S411, the ray irradiation is performed on the baggage basket and the baggage, so that the baggage security inspection information and the baggage basket information are acquired.

In operation S412, the tracking information is acquired according to the acquired baggage basket information, and the tracking information is bound with the baggage security inspection information. The binding method is as described above.

In operation S413, the pedestrian passes the human body security inspection device for security inspection.

In operation S414, security inspection is performed on the pedestrian passing through the human body security device, and the pedestrian security inspection information is acquired.

In operation S415, the tracking information is bound with the pedestrian security inspection information according to the tracking information of the pedestrian. The binding method is as described above.

In operation S416, the baggage security inspection information, the pedestrian security inspection information and the identity information are bound according to the acquired tracking information and uploaded for storage.

According to the embodiments of the present disclosure, the pedestrian detection frame is acquired by detecting the video stream, and each pedestrian detection frame has the coordinate information and the tracking information. According to the coordinate information and the tracking information of the pedestrian detection frame, the baggage security inspection information, the pedestrian security inspection information, and the identity information are bound to acquire all security inspection information of the detected person, so that a security inspection efficiency is improved.

Figure 5:
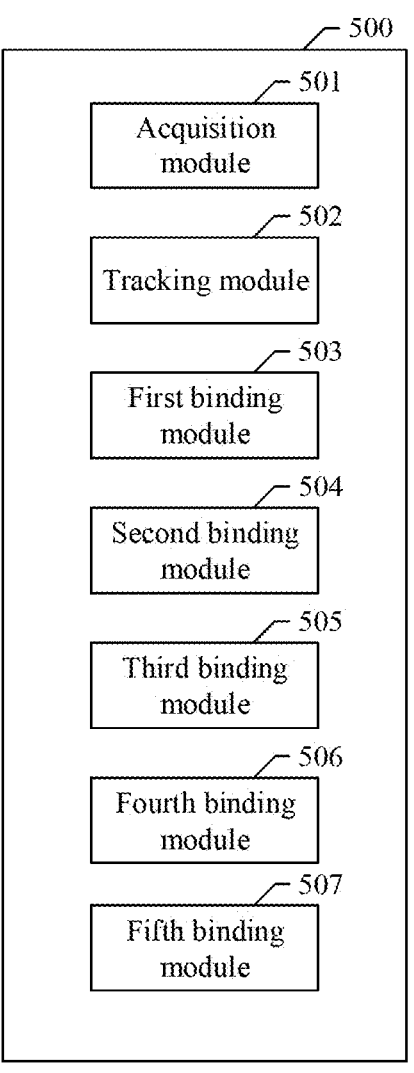
FIG. 5 schematically shows a block diagram of a device of binding security inspection information according to the embodiments of the present disclosure.

FIG. 5 schematically shows a block diagram of a device of binding security inspection information according to the embodiments of the present disclosure.

As shown in FIG. 5, the device 500 of binding security inspection information of the embodiments of the present disclosure includes an acquisition module 501, a tracking module 502, a first binding module 503, a second binding module 504, a third binding module 505, a fourth binding module 506 and a fifth binding module 507.

The acquisition module 501 is configured to acquire a video stream of pedestrians at various positions in the security inspection channel, detect the video stream, and acquire the pedestrian detection frame having the coordinate information and the tracking information. The acquisition module 501 is used to perform the operation S210 of the embodiments of the present disclosure, which will not be repeated here.

The tracking module 502 is configured to extract the pedestrian feature through the pedestrian detection frame, and continuously track each pedestrian in the video stream according to the pedestrian feature and the coordinate information. The tracking module 502 is used to perform the operation S220 of the embodiments of the present disclosure, which will not be repeated here.

The first binding module 503 is configured to verify the identity information of the pedestrian, and bind the verified identity information with the tracking information. The first binding module 503 is used to perform the operation S230 of the embodiments of the present disclosure, which will not be repeated here.

The second binding module 504 is configured to bind the baggage deposition information with the tracking information of the baggage depositor at the baggage placement site. The second binding module 504 is used to perform the operation S240 of the embodiments of the present disclosure, which will not be repeated here.

The third binding module 505 is configured to acquire the baggage security inspection information detected and the baggage deposition information by the detection apparatus, and bind the baggage security inspection information with the tracking information according to the baggage deposition information. The third binding module 505 is used to perform the operation S250 of the embodiments of the present disclosure, which will not be repeated here.

The fourth binding module 506 is configured to acquire the pedestrian security inspection information detected by the detection apparatus and bind the pedestrian security inspection information with the tracking information. The fourth binding module 506 is used to perform the operation S260 of the embodiments of the present disclosure, which will not be repeated here.

The fifth binding module 507 is configured to bind the baggage security inspection information, the pedestrian security inspection information and the identity information according to the tracking information. The fifth binding module 507 is used to perform the operation S270 of the embodiments of the present disclosure, which will not be repeated here.

According to the embodiments of the present disclosure, any number of the acquisition module 501, the tracking module 502, the first binding module 503, the second binding module 504, the third binding module 505, the fourth binding module 506, and the fifth binding module 507 may be combined in one module for implementation, or any one of the modules may be divided into a plurality of modules. Alternatively, at least pan of functions of one or more of these modules may be combined with at least part of functions of other modules and implemented in one module. According to the embodiments of the present disclosure, at least one of the acquisition module 501, the tracking module 502, the first binding module 503, the second binding module 504, the third binding module 505, fourth binding module 506 and the fifth binding module 507 may be implemented at least partially as a hardware circuit, such as a field programmable gate array (FPGA), a programmable logic array (PLA), a system on a chip, a system on a substrate, a system on a package, an application specific integrated circuit (ASIC), or may be implemented by any other reasonable means of hardware or firmware that integrates or packages a circuit, or may be implemented in any one of or a suitable combination of three implementation methods of software, hardware and firmware. Alternatively, at least one of the acquisition module 501, the tracking module 502, the first binding module 503, the second binding module 504, the third binding module 505, the fourth binding module 506, and the fifth binding module 507 may be implemented at least partially as a computer program module which may perform a corresponding function when being executed.

Figure 6:
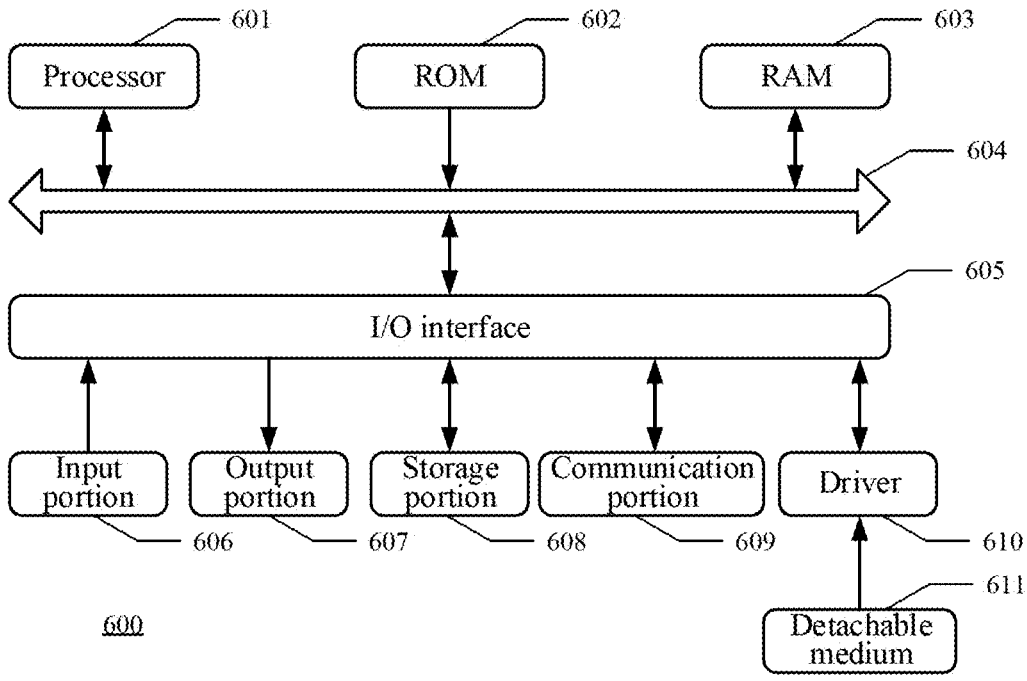
FIG. 6 schematically shows a block diagram of an electronic apparatus suitable for implementing a method of binding security inspection information according to the embodiments of the present disclosure.

FIG. 6 schematically shows a block diagram of an electronic apparatus suitable for implementing a method of binding security inspection information according to the embodiments of the present disclosure. The electronic apparatus shown in FIG. 6 is only an example, and should not be construed as limiting the function and scope of use of the embodiments of the present disclosure.

As shown in FIG. 6, an electronic apparatus 600 according to the embodiments of the present disclosure includes a processor 601 that may perform various appropriate actions and processes according to programs stored in a read-only memory (ROM) 602 or programs loaded from a storage portion 608 to a random access memory (RAM) 603. The processor 601 may include, for example, a general-purpose microprocessor (e.g., a CPU), an instruction set processor and/or a related chipset and/or a special-purpose microprocessor (e.g., an application-specific integrated circuit (ASIC)), etc. The processor 601 may also include an on-board memory for caching purposes. The processor 601 may include a single processing unit or a plurality of processing units for performing different actions of a method flow according to the embodiments of the present disclosure.

Various programs and data required for operations of the electronic apparatus 600 are stored in the RAM 603. The processor 601, the ROM 602 and the RAM 603 are connected to each other through a bus 604. The processor 601 performs various operations of the method flow according to the embodiments of the present disclosure by executing the programs in the ROM 602 and/or the RAM 603. It should be noted that the programs may also be stored in one or more memories other than the ROM 602 and the RAM 603. The processor 601 may also perform the various operations of the method flow according to the embodiments of the present disclosure by executing the programs stored in the one or more memories.

According to the embodiments of the present disclosure, the electronic apparatus 600 may also include an input/output (I/O) interface 605, and the input/output (I/O) interface 605 is also connected to the bus 604. The electronic apparatus 600 may also include one or more of the following components connected to the I/O interface 605: an input portion 606 including a keyboard, a mouse, etc.; an output portion 607 including a cathode ray tube (CRT), a liquid crystal display (LCD), etc., and a speaker, etc.; a storage portion 608 including a hard disk, etc.; and a communication portion 609 including a network interface card such as a LAN card, a modem, etc. The communication portion 60) performs communication processing via a network such as the Internet. A driver 610 is also connected to the I/O interface 605 as required. A detachable medium 611, such as a magnetic disk, an optical disk, a magneto-optical disk, a semiconductor memory, etc., is mounted on the drive 610 as required, which is convenient for a computer program read therefrom to be installed into the storage portion 608 as required.

The present disclosure further provides a computer-readable storage medium. The computer-readable storage medium may be included in the apparatus/device/system described in the above-mentioned embodiments, and may also exist alone without being assembled into the apparatus/device/system. The computer-readable storage medium described above carries one or more programs, when the one or more programs are executed, implements the method of binding security inspection information according to the embodiments of the present disclosure.

According to the embodiments of the present disclosure, the computer-readable storage medium may be a nonvolatile computer-readable storage medium, including but not limited to: a portable computer disk, a hard disk, a random access memory (RAM), a read only memory (ROM), an erasable programmable read only memory (EPROM or flash memory), a portable compact disk read only memory (CD-ROM), an optical storage device, a magnetic storage device, or any suitable combination of the above, in the present disclosure, the computer-readable storage medium may be any tangible medium that includes or stores a program that may be used by or in conjunction with an instruction execution system, apparatus or device. For example, according to the embodiments of the present disclosure, the computer-readable storage medium may include one or more memories other than the ROM 602 and/or the RAM 603 and/or the ROM 602 and the RAM 603 described above.

Those skilled in the art will understand that features recited in the various embodiments and/or the claims of the present disclosure may be combined and/or incorporated in a variety of ways, even if such combinations or incorporations are not clearly recited in the present disclosure. In particular, the features recited in the various embodiments and/or the claims of the present disclosure may be combined and/or incorporated without departing from the spirit and teachings of the present disclosure, and all such combinations and/or incorporations fall within the scope of the present disclosure.

The embodiments of the present disclosure have been described above. However, these embodiments are for illustrative purposes only, and are not intended to limit the scope of the present disclosure. Although the various embodiments are described above separately, this does not mean that the measures in the various embodiments may not be advantageously used in combination. The scope of the present disclosure is defined by the appended claims and their equivalents. Without departing from the scope of the present disclosure, those skilled in the art may make various substitutions and modifications, and these substitutions and modifications should all fall within the scope of the present disclosure.

What is claimed is:

1. A method of binding security inspection information, comprising:

acquiring a video stream of pedestrians at each position in a security inspection channel, detecting the video stream to acquire a pedestrian detection frame, wherein the pedestrian detection frame has a coordinate information in a three-dimensional coordinate space and a tracking information;

extracting a pedestrian feature through the pedestrian detection frame, and continuously tracking each pedestrian in the video stream according to the pedestrian feature and the coordinate information;

verifying an identity information of a pedestrian by an identity verification device through face recognition, scanning of identity card, and ticket inspection, and binding the verified identity information with the tracking information, wherein the verified identity information is used to allow the pedestrian to enter the security inspection channel;

binding a baggage deposition information with the tracking information at a baggage placement site;

acquiring a baggage security inspection information and the baggage deposition information detected by a detection apparatus, and binding the baggage security inspection information with the tracking information according to the baggage deposition information;

acquiring a pedestrian security inspection information by a human body security inspection device by performing security inspection on the pedestrian when the pedestrian passes through the human body security inspection device, and binding the pedestrian security inspection information with the tracking information; and binding the baggage security inspection information, the pedestrian security inspection information and the identity information according to the tracking information, wherein the baggage deposition information comprises a baggage placement table number and a baggage basket number, and wherein the binding a baggage deposition information with the tracking information at a baggage placement site comprises:

acquiring a baggage placement table number and a baggage basket number;

acquiring a placement table coordinate of the baggage placement table according to the baggage placement table number;

searching a tracking information of the pedestrian detection frame within a preset range of the placement table coordinate, and selecting the pedestrian detection frame closest to the placement table coordinate as a baggage depositor; and binding a tracking information of the baggage depositor with the baggage basket number.

2. The method according to claim 1, wherein the coordinate information is converted from a global coordinate system where the security inspection channel is located and a relative coordinate system where the detection apparatus is located, and wherein the coordinate information comprises an x-axis coordinate and a y-axis coordinate that are parallel to a horizontal plane and perpendicular to each other, and a z-axis coordinate perpendicular to the horizontal plane, and the coordinate information is acquired by a depth image calculation.

3. The method according to claim 2, wherein the detection apparatus comprises at least one of the identity verification device, a camera device, the human body security inspection device, a baggage placement device and a baggage security inspection device.

4. The method according to claim 1, wherein the extracting a pedestrian feature through the pedestrian detection frame comprises:

intercepting a pedestrian image on a visible light image of the video stream by using the pedestrian detection frame, and extracting a pedestrian feature of the pedestrian image by using a feature extraction network.

5. The method according to claim 1, wherein the video stream is acquired through at least one camera, wherein the continuously tracking each pedestrian in the video stream according to the pedestrian feature and the coordinate information comprises:

continuously tracking each pedestrian in a single-camera video stream, and continuously tracking each pedestrian in a multi-camera video stream.

6. The method according to claim 5, wherein the continuously tracking each pedestrian in a single-camera video stream comprises:

matching and associating the pedestrian detection frame of a current frame in the single-camera video stream with pedestrian detection frames of adjacent frames in the single-camera video stream to continuously track each pedestrian, wherein the pedestrian features of the matched and associated pedestrian detection frame of the current frame and pedestrian detection frames of adjacent frames meet a preset feature similarity, and the coordinate information of the matched and associated pedestrian detection frame of the current frame and pedestrian detection frames of adjacent frames meets a preset distance.

7. The method according to claim 5, wherein the continuously tracking each pedestrian in a multi-camera video stream comprises:

matching and associating pedestrian detection frames having a same tracking information in a same time period in video streams shot by different cameras to continuously track each pedestrian, wherein the pedestrian features of the matched and associated pedestrian detection frames meet a preset feature similarity, and the coordinate information of the matched and associated pedestrian detection frames meets a preset distance.

8. The method according to claim 1, wherein the acquiring a baggage security inspection information and the baggage deposition information detected by a detection apparatus, and binding the baggage security inspection information with the tracking information according to the baggage deposition information comprises:

performing a ray irradiation on the baggage through the detection apparatus to generate the baggage security inspection information, wherein the baggage security inspection information comprises a ray radiation image;

performing a ray irradiation on the baggage basket through the detection apparatus, acquiring a ray radiation image of the baggage basket, processing the ray radiation image of the baggage basket and acquiring the baggage basket number; and binding the tracking information bound with the baggage basket with the baggage security inspection information.

9. The method according to claim 1, wherein the acquiring a pedestrian security inspection information detected by the detection apparatus, and binding the pedestrian security inspection information with the tracking information comprises:

acquiring the pedestrian security inspection information detected by the detection apparatus;

acquiring a coordinate of the detection apparatus according to the pedestrian security inspection information;

searching a tracking information of the pedestrian detection frame within a preset range of the coordinate of the detection apparatus, and selecting the pedestrian detection frame closest to the coordinate of the detection apparatus as a target pedestrian detection frame; and binding the pedestrian security inspection information with a tracking information of the target pedestrian detection frame.

10. An electronic apparatus, comprising:

one or more processors; and a storage device for storing executable instructions, wherein the executable instructions, when being executed by the processor, implement the method according to claim 1.

11. A non-transitory computer-readable storage medium having executable instructions thereon, wherein the instructions, when being executed by a processor, implement the method according to claim 1.

\* \* \* \* \*